(12) United States Patent
Rebolledo et al.

(10) Patent No.: US 8,358,967 B1
(45) Date of Patent: Jan. 22, 2013

(54) TOWED NETWORK COMMUNICATIONS SUBSYSTEM FOR IN FLIGHT USE BY TOWING AIRCRAFT

(75) Inventors: Robert G. Rebolledo, Park City, UT (US); William Henry Hanewinkel, III, Salt Lake City, UT (US); Paul C. Cherry, West Jordan, UT (US); Thomas R. Giallorenzi, Sandy, UT (US)

(73) Assignee: L-3 Communications, Salt Lake City, UT (US)

( * ) Notice: Subject to any disclaimer, the term of this patent is extended or adjusted under 35 U.S.C. 154(b) by 1134 days.

(21) Appl. No.: 12/325,942

(22) Filed: Dec. 1, 2008

(51) Int. Cl.
*H04B 7/15* (2006.01)
(52) U.S. Cl. ............................ 455/11.1; 455/73; 342/9
(58) Field of Classification Search ............... 455/67.11, 455/11.1; 342/9, 14, 173; 244/3.1, 3.12, 244/3.14
See application file for complete search history.

(56) References Cited

U.S. PATENT DOCUMENTS

| | | | |
|---|---|---|---|
| 3,496,567 A | 2/1970 | Held | |
| 3,806,944 A | 4/1974 | Bickel | |
| 3,829,861 A | 8/1974 | Karaganis et al. | |
| 4,556,889 A | 12/1985 | Buehler | |
| 4,730,194 A | 3/1988 | Tharp | |
| 5,136,295 A * | 8/1992 | Bull et al. | 342/15 |
| 5,326,040 A | 7/1994 | Kramer | |
| 5,357,259 A | 10/1994 | Nosal | |
| 5,379,034 A | 1/1995 | O'Connell | |
| 5,722,618 A | 3/1998 | Jacobs et al. | |
| 5,765,098 A * | 6/1998 | Bella | 455/13.3 |
| 6,384,700 B1 | 5/2002 | Craine et al. | |
| 6,422,506 B1 | 7/2002 | Colby | |
| 6,697,008 B1 * | 2/2004 | Sternowski | 342/14 |
| 6,804,495 B2 * | 10/2004 | Duthie | 455/67.11 |
| 6,844,855 B2 | 1/2005 | Carson | |
| 7,051,636 B1 * | 5/2006 | Snow et al. | 89/1.11 |
| 7,116,275 B2 * | 10/2006 | Hedrick | 343/700 MS |
| 2002/0190162 A1 | 12/2002 | McDonnell | |
| 2005/0179577 A1 | 8/2005 | Eneroth | |

FOREIGN PATENT DOCUMENTS

GB 2342983 A * 4/2000

* cited by examiner

*Primary Examiner* — Raymond Dean
(74) *Attorney, Agent, or Firm* — Kirton McConkie (57) ABSTRACT

The present invention relates to a towed wireless network communications subsystem for use in flight by a towing aircraft. The towed wireless network communications subsystem includes an aerodynamic enclosure having a tether attachment and configured to be towed by the towing aircraft. A directional antenna is disposed on the aerodynamic enclosure and is capable of forming one or more directional communications beams within a wireless network. A communications device is disposed in the aerodynamic enclosure and is coupled to the directional antenna(s). The communications device is configured to relay communications data between the towing aircraft and the wireless network.

28 Claims, 9 Drawing Sheets

TOWED NETWORK COMMUNICATIONS SUBSYSTEM FOR IN FLIGHT USE BY TOWING AIRCRAFT

FIELD OF THE INVENTION

The present application relates to wireless communications. In particular, the present application relates to an aircraft-towed communication device.

BACKGROUND

In airborne communications applications, communications equipment is used to send and receive communications signals. Typically, antennas are located on the outer fuselage of an aircraft while other communications equipment is located inside the aircraft. An antenna (e.g., a radio antenna or optical aperture) provides a means for the radiation of an electromagnetic communications signal from the aircraft, for the reception of electromagnetic communications signals directed toward the aircraft, or both.

An antenna (or group of antennas) can have both a field of view and a field of regard. Field of view (FOV) is the area which is visible to the antenna at a given instant in time. Field of regard (FOR) is the area over which an antenna can communicate. For example, a steerable directional antenna may have a relatively small FOV (e.g., a narrow beamwidth), but may be pointable in different directions to provide a large FOR. A 100% FOR corresponds to full spherical coverage, or a spherical angle coverage area of $4\pi$ steradian.

Depending on where antennas are positioned on an aircraft, differing FOR can be obtained. For example, an antenna positioned on the underside of an aircraft can theoretically provide hemispherical (50%) FOR, in that it could theoretically be able to communicate with any object below the plane of the aircraft. In practice, however, the achieved FOR for such an antenna is typically much less than the full hemisphere. Practical limitations include obstructions, such as other portions of the aircraft structure, difficulty in providing antenna operation at small angles relative to a surface on (or in) which the antenna is mounted, and obstruction by the aircraft due to maneuvering. Accordingly, actual FOR achieved by a single antenna is often substantially less than hemispherical (e.g., 45% or less, or even 25% or less).

Conventionally, to provide an aircraft with an overall 100% FOR, six or more antenna/apertures located strategically on the outer fuselage of the aircraft are used. Unfortunately, each of these antenna/aperture installations affects the aircraft's performance and cost. Positioning of antennas on an airborne platform can be challenging, as the location of the antennas on the fuselage is often constrained by a number of factors. These factors can include aerodynamic considerations, access consideration, cabling considerations, and the like. Accordingly, in many applications it is not possible to provide an adequate number of antennas in adequate positions to provide a full or nearly full FOR in an aircraft communication system.

SUMMARY OF THE INVENTION

It has been recognized that it would be advantageous to develop an aircraft communications system that provides the aircraft with near full field of regard communications capability.

In some embodiments of the invention, a wireless network communications subsystem is provided for use by a towing aircraft. The wireless network communications subsystem can include an aerodynamic enclosure with a tether attachment for towing by an aircraft. The aerodynamic enclosure can include a directional antenna coupled to the enclosure and a communications device in the enclosure. The communications device is configured to relay communications data between the towing aircraft and a wireless network.

In some embodiments of the invention, a communications system is provided having near full field of regard. The system can include an aircraft and a wireless network communications device connected to the aircraft. The wireless network communications device can include an aerodynamic enclosure and a means for forming a directional communications link within a wireless network. The aerodynamic enclosure is connected to the aircraft by a tether, and the network communications device is towed by the aircraft during flight.

In some embodiments of the invention, a method of providing an aircraft with a near full-field-of-regard wireless network communications capability is provided. The method can include providing a directional antenna on an aerodynamic towable pod. The directional antenna can be capable of forming a directional communications beam within a wireless network. The method can also include towing the aerodynamic towable pod behind the aircraft with a tether at a sufficient distance to provide the directional antenna with near full-field-of-regard. The method can further include forming a communications link between the directional antenna and a wireless network.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to an "antenna" includes reference to one or more "antennas". Moreover, where plurality referents are used, the usage of singular referents in the same context is not meant to exclude such singular referents from excluding the plural. Thus, for example, reference to "a radio transceiver and a plurality of antennas" includes reference to "a plurality of radio transceivers and a plurality of antennas."

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to skill in the art, may occur.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to 5" or "less than about 5" should be interpreted to include not only the explicitly recited values of about 1 and about 5, but also include individual values and sub-ranges within the indicated range. Thus, included in this numerical range are individual values such as 2, 3, and 4 and sub-ranges such as 1-3, 2-4, and 3-5, etc.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

To mitigate the above-mentioned problems with prior aircraft communications systems, the present application is generally directed toward systems and methods for towing a wireless network communications subsystem (also referred to as a "towed communications subsystem") behind an aircraft. By towing this subsystem at a sufficient distance from the towing aircraft, a near full field of regard (FOR) can be achieved by mitigating aircraft line-of-site blockage as described further below. This approach can significantly reduce the cost of an airborne communication system, for example, by avoiding or reducing modifications to the aircraft. Furthermore, by moving the communications subsystem away from the aircraft, interference between the communications subsystem and electronic systems on the aircraft can be reduced. Other benefits can also be obtained, as explained further below.

Figure 1:
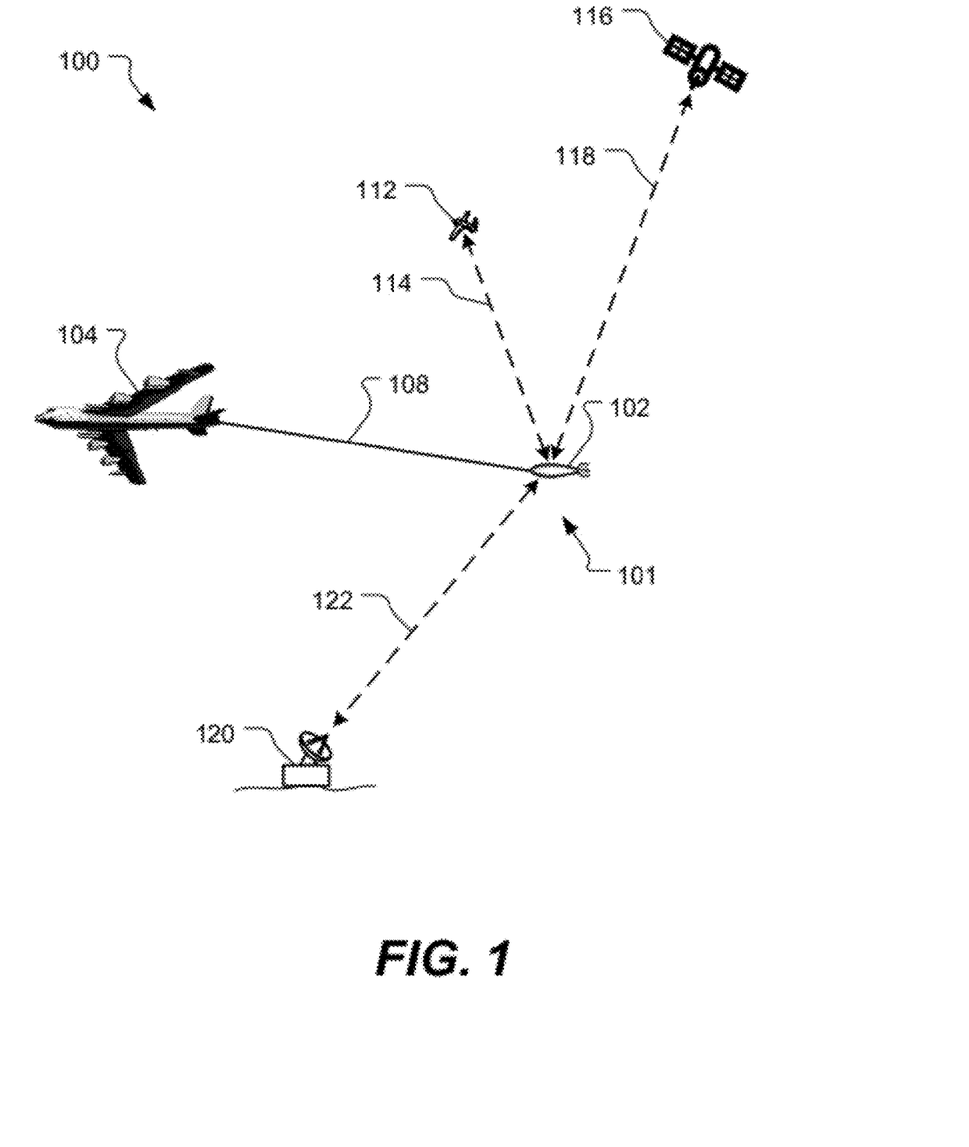
FIG. 1 is a perspective illustration of a communications system having an aircraft towing a wireless network communications subsystem in accordance with some embodiments of the invention.

Turning to the figures, FIG. 1 illustrates a communications system 100 in accordance with some embodiments of the present invention. The communications system can include a towed communications subsystem 101 towed behind an aircraft 104 (also referred to as a "towing aircraft"). The towed communications subsystem can include an aerodynamic enclosure 102 coupled to the aircraft via a tether 108. The towed communications subsystem can also include one or more antennas (not shown in FIG. 1) and one or more communications devices (not shown in FIG. 1), for example, as described further below in conjunction with FIGS. 4-12.

FOR from the towed communications subsystem is the percentage of solid angle spherical view that is not obscured by the tether or the aircraft. Thus, the towed communications subsystem can achieve an extraordinary FOR, as depending on the length of the tether and size of the aircraft, as only a very small portion of the FOR of the towed communications subsystem is blocked by the aircraft. In particular, the aircraft and tether present the only substantial obstacles with respect to achieving a large FOR from the towed communications subsystem. As the tether length increases, less FOR is obscured by the aircraft.

The percentage of the solid angle spherical obscuration of the aircraft 104 is inversely proportional to the square of the distance between the aircraft and the towed communications subsystem 101. The solid angle obscured, $\Omega$, is proportional to the surface area, S, of a projection of the aircraft onto a sphere centered at the towed communications subsystem, divided by the square of the sphere's radius, R. Symbolically, $\Omega = k \, S/R^2$, where k is the proportionality constant. To find the solid angle in terms of fractions of a sphere $k=1/4\pi$. Accordingly, since k and S remain constant in any given application, the distance of R, or the distance between the aircraft and the towed communications subsystem, determines the percentage of solid angle spherical obscuration of the aircraft 104. R is primarily governed by the length of the tether 108.

For example, using a ray tracing simulation, FOR was computed (ignoring obstruction caused by the tether itself, which is typically a small contributor to obscuration) for a B737 size aircraft towing an airborne communications subsystem using tether lengths between about 200 and about 700 feet. It was found that, for tether lengths of greater than about 200 feet, the FOR exceeded about 99.9%, and for tether lengths greater than about 300 feet, the FOR exceeded about 99.99%. This calculation was performed assuming 8% beamwidth for the antenna. In addition, the degradation to a communication system was determined for situations where there was partial obscuration. One surprising result found was that, even in directions where the antenna is looking directly toward the towing aircraft, the antenna line of sight is not completely obscured, and thus modest losses of up to about 2 dB were incurred. Accordingly, depending on the link margin available to the communications links, and the amount of loss due to partial obscuration, effectively 100% FOR can be obtained. Accordingly, the tether length, size of the aircraft, and communications links margin, and possibly other factors all contribute to the actual FOR obtained by the communication system 100, however, near full (100%) FOR can be obtained for suitable selection of the various parameters.

Of course, the aircraft is not limited to B737 type aircraft, and the aircraft can be, for example, a fighter or tactical aircraft, high altitude surveillance aircraft, commercial configuration, or even an unmanned aerial vehicle.

Depending on the speed of the aircraft and other factors, the towed communications subsystem 101 can have an offset flight position relative to the aircraft 104. For example, as illustrated here, the towed communications subsystem can have a flight position relatively lower than that of the aircraft 104. This offset position can be modified based on the length of the tether 108, the size and weight of the wireless network communications subsystem, the speed and altitude of the aircraft, the aerodynamics of the enclosure, and other factors. Accordingly, if desired, the towed communications subsystem position can be modified so that the enclosure flies outside of the turbulence produced by the towing aircraft. This can be, for example, beneficial in stabilizing the towed communications subsystem and can be particularly beneficial in reducing loss in optical communications links that can be disrupted by turbulent air.

The towed communications subsystem 101 can also be placed in a flight position wherein it drafts off the towing aircraft. In some embodiments, the flight position can be controlled and modified by flight control surfaces on the aerodynamic enclosure 102 (for example, as explained in detail below).

A directional antenna (for example, as shown and described in further detail below) can be included in or on the enclosure 102. The directional antenna can be capable of forming one or more directional communications links within a wireless network. In some embodiments, the directional antenna can be a phased array radio frequency antenna, for example, as described further below. In some embodiments, the directional antenna can be an optical aperture, for example as described further below. In some embodiments, a plurality of directional antennas can be included on the exterior of the enclosure.

A communications device (for example, as shown and described in further detail below) can disposed within the aerodynamic enclosure 102 and coupled to the directional antenna. The communications device can relay communications data between the towing aircraft 104 and a wireless network. For example, as described further below, the communications device can include radio transmitters and/or receivers, optical radio transmitters and/or receivers, and the like, to establish wireless communication links within a wireless network.

For example, links 114, 118, 122 can be formed to other nodes within a wireless network. For example, a link 114 can be formed to another aircraft 112. In another example, a link 122 can be formed to a ground-based communications system 120. In yet another example, a communications link 118 can be formed to or through a satellite 116. In some embodiments, the towed communications subsystem 101 can be capable of forming multiple simultaneous beams, allowing communications to a plurality of other nodes. While examples have been shown to an aircraft, ground-based communications systems, and a satellite, it will be appreciated that the directional communications links are not limited to these particular examples or number of links. Accordingly, the number of links, types of links, and types of other nodes can all vary. Moreover, the number of links can vary during operation, as links are brought up and down depending on what nodes are in the network and the connectivity that can be achieved. Various ways of managing dynamic networks, wherein nodes enter and leave the network over time are known and need not be described further herein.

Figure 2A:
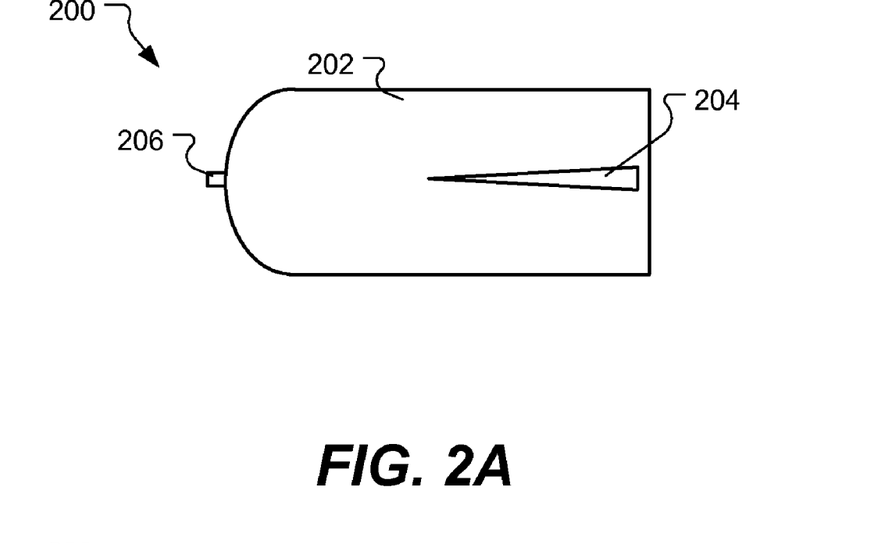
FIG. 2A is side view illustration of an aerodynamic enclosure in accordance with some embodiments of the invention.
Figure 2B:
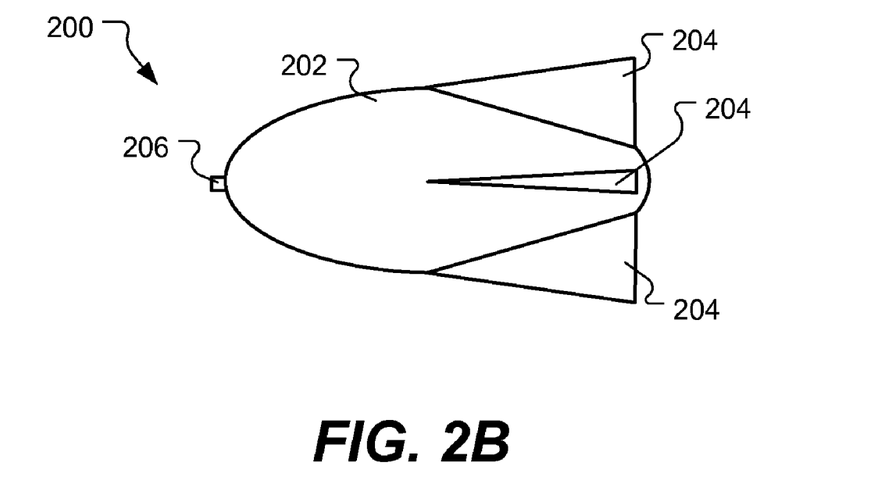
FIG. 2B is top view of the aerodynamic enclosure of FIG. 2A.

Turning to the towed communications subsystem in further detail, FIGS. 2A-2B illustrate an aerodynamic enclosure 200 according to some embodiments of the present invention. FIG. 2A illustrates a side view of the enclosure 200, and FIG. 2B illustrates a top view of the enclosure 200. The enclosure 200 can include an encasement body 202 and a tether attachment 206. In some embodiments, the aerodynamic enclosure can include one or more flight control surfaces, such as fins 204, etc. The flight control surfaces can be passive (e.g., fixed in position) or active (e.g., movable under control to affect attitude, as described further below). In other embodiments, the aerodynamic enclosure has no fins or other flight control surface.

As a particular example, in some embodiments the enclosure 200 can be about six feet in length, about three feet in width, and about one foot in height. Such an enclosure, with corresponding internal communications devices can weigh, for example, between about 20 to 40 pounds. In flight, at 20,000 feet altitude, at the speed of 0.8 mach, such an enclosure produces, for example, about 740 pounds of drag. In some embodiments, the enclosure can include flight control surfaces that produce lift when in flight. Of course, other dimensions, sizes, and shapes of the enclosure can be used to accommodate application-specific or towing-aircraft-specific needs. The foregoing are examples only, and the enclosure is not limited to any particular size, weight, or arrangement.

As illustrated, a tether attachment 206 can be located on the center of the front portion of the enclosure 200. In other embodiments, a tether attachment can be located on the top of the front portion of the enclosure, the front portion of the top of the enclosure, the center of the top of the enclosure, etc. As illustrated, the tether attachment can protrude from the enclosure 200. In other embodiments, a tether attachment can be positioned flush with the enclosure or disposed on an inner portion of the enclosure. Various ways of attaching the tether to the tether attachment can be used, including for example, clipping, mechanically interlocking, bolting, and various other techniques. The tether and/or attachment can include a rotary joint.

Figure 3:
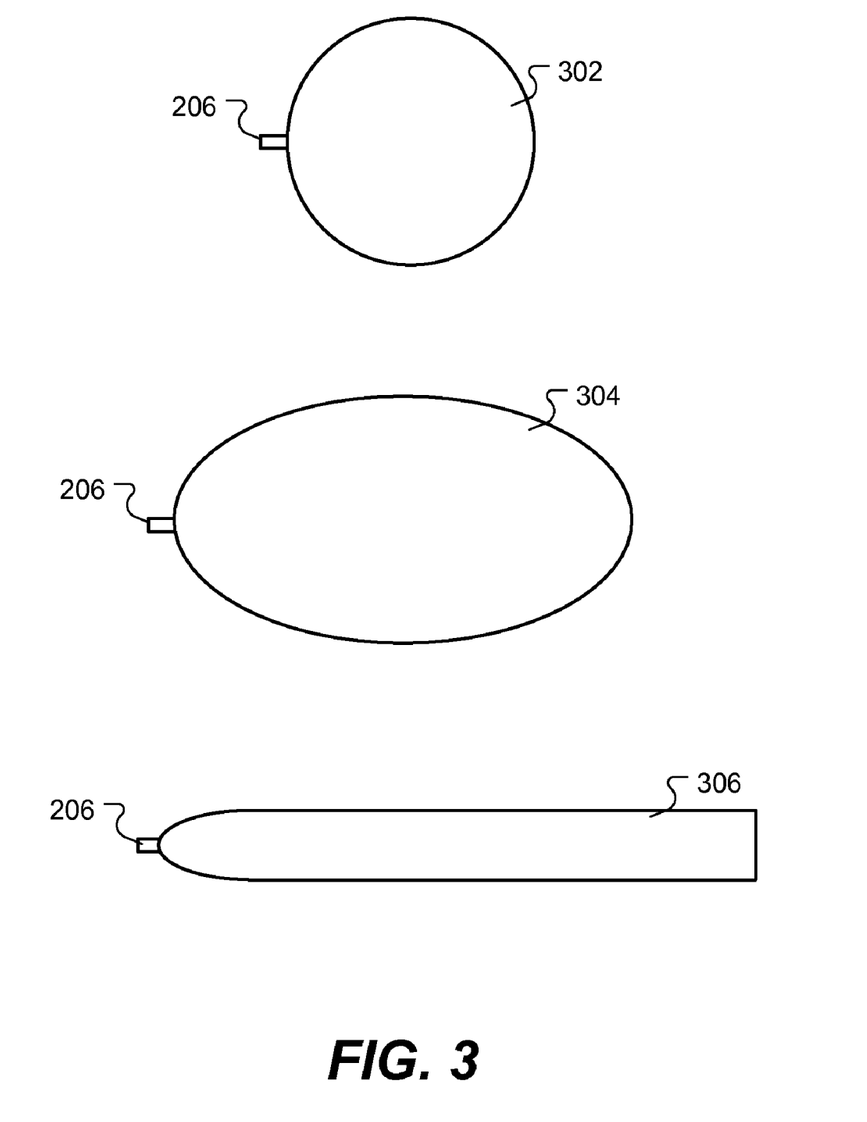
FIG. 3 is a side view illustration of several different aerodynamic enclosures in accordance with some embodiments of the invention.

Other shapes for the aerodynamic enclosure can also be used as illustrated in FIG. 3. For example, in some embodiments, the enclosure 302 can have a substantially spherical shape. Such a shape can be beneficial, for example, when covering the entire surface of the enclosure with antenna elements. As another example, in some embodiments, the enclosure 304 can have an elliptical shape. For example, such a shape can provide lower drag and higher stability than a spherical shape. As another example, in some embodiments, the enclosure 306 can have a missile-like shape. Such a shape can be beneficial, for example, when the towed communications subsystem is to be stored in a weapons bay when not deployed, as well as providing low drag and high stability.

Differing types and/or shapes of towed wireless network communications subsystem can be used in a system, if desired. For example, an optical type towed subsystem and a radio type towed subsystem may be provided in separate enclosures, and the type of system desired can be deployed. Systems as described herein can provide benefits for testing and experimentation with different antenna types, since changes to the aircraft can be avoided.

A towed wireless network communications subsystem (e.g. 100 of FIG. 1) can include a communications device disposed within an aerodynamic enclosure. Various types of communications devices can be used to provide, for example, radio communications links, optical communications links, or the like. Accordingly, the communications device can be an optical communications subsystem, for example, as described in further detail below. As another example, the communications device can be a radio transceiver, for example as described further below. As another example, the communications device can be an active communications device, such as optical or radio equipment described above. As another example, the communications device can be a passive device, such as a redirector.

Figure 4:
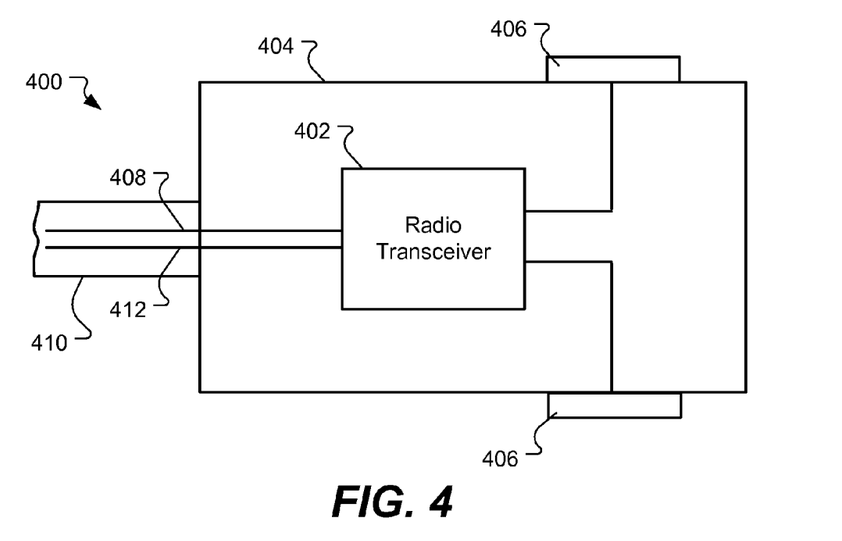
FIG. 4 is a block diagram of a towed wireless network communications subsystem according to some embodiments of the invention.

FIG. 4 illustrates a block diagram of towed communications subsystem 400 having a radio frequency transceiver 402 disposed within an aerodynamic enclosure 404 (e.g., 102, 202, 302, 304, 306) in accordance with some embodiments of the invention. The transceiver is coupled to one or more antennas 406. The antennas can be of various configurations, for example, as described further herein. The transceiver transmits and receives radio frequency communications signals within a communications network via the antennas. Data for transmission and received data can be provided to/from a towing aircraft (e.g., 104 of FIG. 1) via a data interface 408 portion of a tether 410. Power for the transceiver can be provided via a power interface 412 also supplied via the tether. Other data (e.g., control and status information related to the towed communications subsystem) can also be exchanged with the towing aircraft via the data interface portion of the tether if desired.

Figure 5:
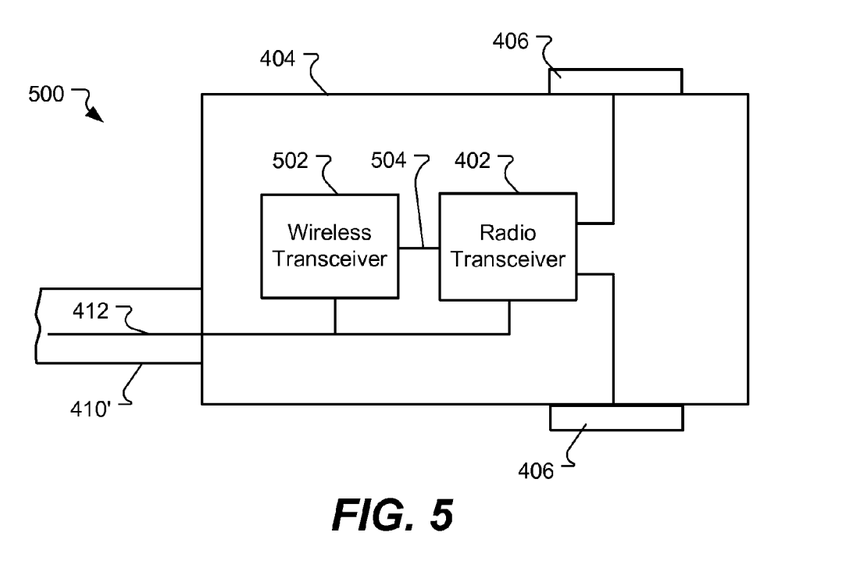
FIG. 5 is a block diagram illustration of a towed wireless network communications subsystem having a wireless data interface to a towing aircraft according to some embodiments of the invention.

As an alternate to exchanging data via the data interface 408 of the tether 410, data can be exchanged wirelessly with the towing aircraft, for example, using a towed communications subsystem as illustrated in FIG. 5 in accordance with some embodiments of the present invention. The subsystem 500 of FIG. 5 is similar to that of FIG. 4, except that a data interface 504 from the radio frequency transceiver 402 can be provided to a wireless transceiver 502. The wireless transceiver can provide for short-range communication of the data with the towing aircraft. The wireless transceiver can be, for example, a radio, optical, or like transceiver. The tether 410' need not necessarily include a data interface portion.

Figure 6:
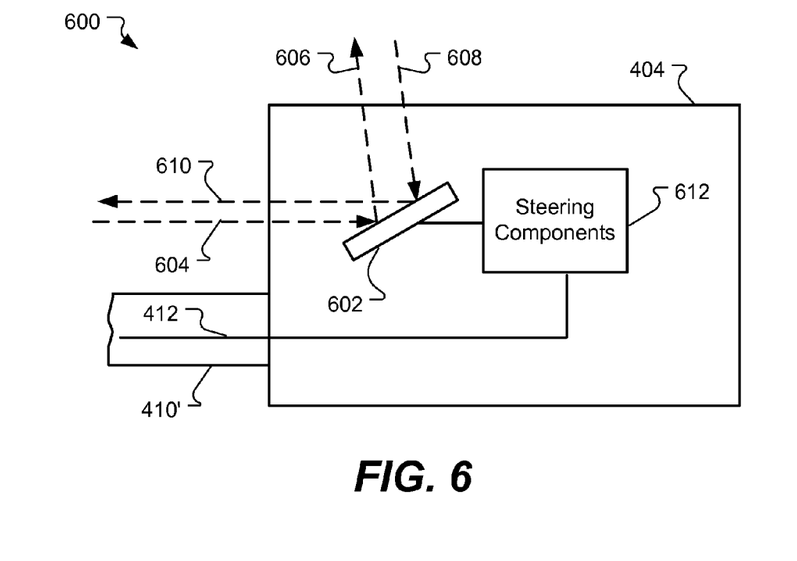
FIG. 6 is block diagram of a towed wireless network communications subsystem having a passive redirector according to some embodiments of the invention.

Another example of towed communications subsystem using a passive reflector is illustrated in FIG. 6. The towed communications subsystem 600 includes a passive reflector 602 disposed on or in the enclosure 404. The passive reflector can receive radio or optical energy 604 transmitted from the towing aircraft and redirect it toward 606 a wireless communication network node. In addition, radio or optical energy 608 can be received from a wireless communication network node and redirected toward 610 the towing aircraft. The reflector can include steering components 612 coupled thereto to allow control of the orientation of the reflector, for example, to allow beams to be swept, scanned, or switched between multiple nodes. Control of the reflector orientation can be provided by data exchanged with the host aircraft, for example, via a data interface included in the tether (e.g., like 408 in FIG. 4) or a wireless link (e.g., like 502 in FIG. 5).

Multiple steerable reflectors can be included in the towed communications subsystem to allow for multiple simultaneous independently steerable beams.

Figure 7:
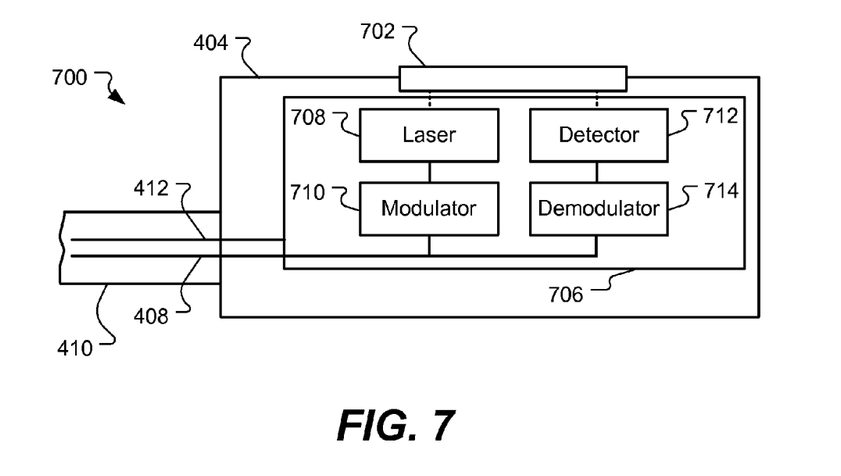
FIG. 7 is block diagram of a towed wireless network communications subsystem having an optical communications subsystem according to some embodiments of the invention.

Yet another example of a towed communications system is shown in FIG. 7. The towed communications system 700 includes an antenna in the form of an optical aperture 702, such as for example, a lens, telescope, or the like. An optical communications subsystem 706 is coupled to the aperture, and can include one or more of a laser 708 and modulator 710 for transmitting, and one or more of a detector 712 and demodulator 714 for receiving. Operation can use, for example, visible or infrared optical radiation to provide one or more free space optical communications links within a wireless network. While a particular arrangement of the optical communications subsystem is shown, other alternate arrangements can be used.

Although not illustrated, here, in another example, a towed communication system in accordance with some embodiments of the present invention can include both optical and radio frequency communications equipment, for example, combining components shown in any of FIGS. 4-7.

The communications equipment (e.g., 402, 502, 602, and 706) disposed in the aerodynamic enclosure can operate in conjunction with communications equipment (not shown) disposed in the host aircraft. For example, communications equipment can include modems, up/down converters, frequency references, amplifiers, filters, data processing equipment, cryptographic equipment, network interfaces, and similar devices. The communications equipment can be partitioned so that some of this equipment is located on the host aircraft, helping to keep the size, weight, and power requirements of the towed subsystem low. For example, data communicated between the host aircraft and the towed subsystem can be in the form of encrypted data, encoded data, baseband signals, intermediate frequency signals, radio frequency signals, or the like.

Figure 13:
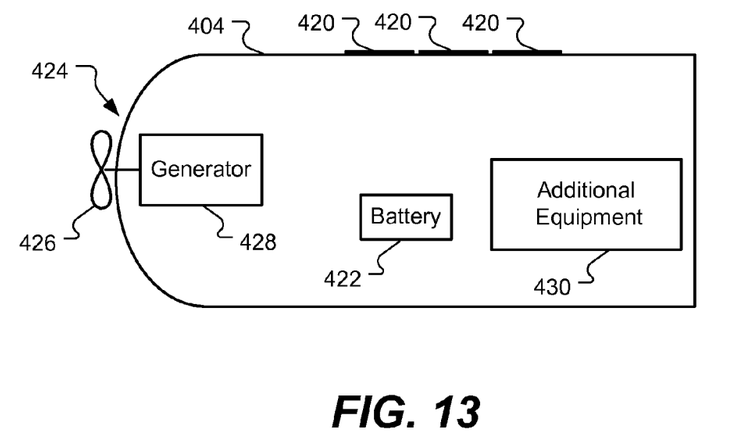
FIG. 13 is a side view illustration of an aerodynamic enclosure having various power generating means according to some embodiments of the invention.

As mentioned above, a towed communications subsystem (e.g., 400, 500, 600, and 700) can receive power via the tether in some embodiments. In other embodiments, the towed communications subsystem can include a power source. FIG. 13 illustrates an enclosure 404 having several different power sources, although it will be appreciated that not all power sources will necessarily be included in an implementation of the system. In some embodiments, the power source can include one or more solar cells 420 disposed on the aerodynamic enclosure. In other embodiments, the power source can include a battery 422. In other embodiments, the power source can include a wind turbine 424, for example having a rotor 426 disposed on the outside of the aerodynamic enclosure that is driven as the enclosure is towed through the air and coupled to a generator 428 disposed within the aerodynamic enclosure. Additional embodiments can include combinations of these power sources. For instance, a solar cell can be combined with a battery, or a wind turbine generator can be combined with a battery, etc. The power source can serve as a primary or backup power source. If a power source is provided in or on the towed communications subsystem, the tether 410 need not necessarily include a power interface 412 in some embodiments.

Additional equipment 430 can also be included in the aerodynamic enclosure 404 if desired. For example, additional equipment can include signal intelligence gathering equipment (e.g., receivers and/or antennas), electronic counter measures devices (e.g. transmitters and/or antennas), and similar components. Equipment positioned in the aerodynamic enclosure can benefit from being towed behind the host aircraft. For example, by positioning the towed communications subsystem away from the host aircraft, interference by signals intentionally and unintentionally radiated by the host aircraft can be reduced. This can allow for increased sensitivity in signal intelligence applications. Similarly, by positioning an electronic countermeasure device away from the host aircraft, interference and threats to the host aircraft can be reduced. Although not shown, environmental control equipment (e.g., heating, cooling, etc.) can also be included in the aerodynamic enclosure if desired Returning to FIG. 4, addition details on various embodiments of the directional antenna(s) 406 disposed in or on the enclosure 404 will now be described. In general, directional antennas can concentrate radiated or received electromagnetic radiation in a particular direction to form a directional link. Accordingly, a directional antenna can provide increased power to transmitted or received communications signals. This increased power can be used to provide increased data rates or reduce power requirements.

Various types of directional antennas can be used in embodiments of the present invention. For example, in some embodiments, the directional antenna can be a phased array radio frequency antenna. A phased array antenna is a group of antenna elements in which the relative phases of the antenna elements are varied in such a way that the combined signals are reinforced in some directions and suppressed in other direction to form one or more antenna beams. Steering of the antenna beams can be accomplished by varying the relative phases. Phased array antennas can be used for transmission, reception, or both.

Figure 8:
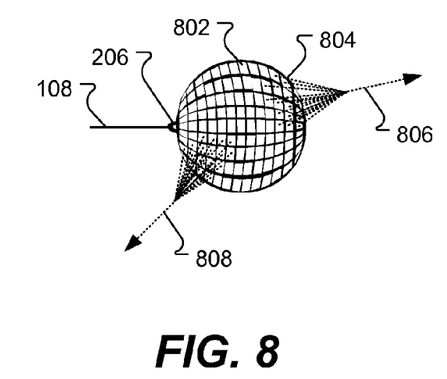
FIG. 8 is a perspective illustration of a towed wireless network communications subsystem having a conformal antenna according to some embodiments of the present invention.

Phase array antenna elements can be disposed in various arrangements. For example, as shown in FIG. 8, antenna elements 802 can be disposed on the outside of an aerodynamic enclosure 804, for example, using a conformal antenna array which conforms to an exterior surface of the enclosure. Such a configuration can be beneficial, for example, to provide operation regardless of the flight orientation of the enclosure.

Figure 9:
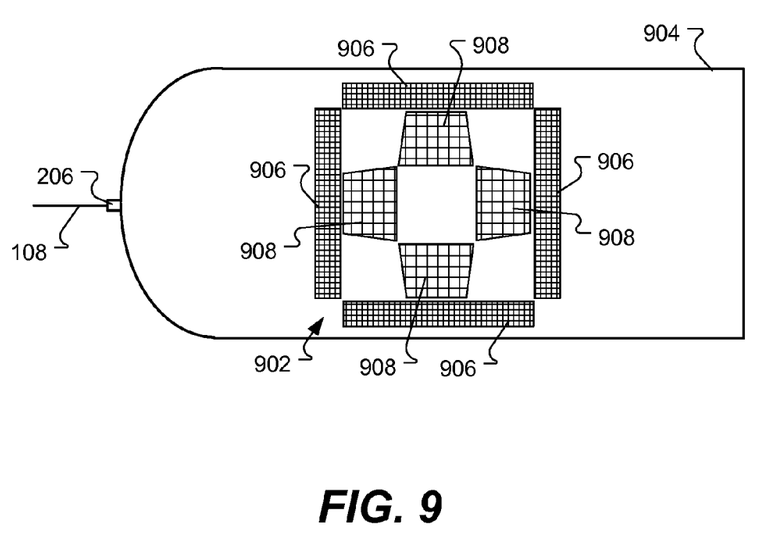
FIG. 9 is a block diagram illustration of a towed wireless network communications subsystem having a sectored phased array antenna according to some embodiments of the invention.

As another example, as shown in FIG. 9, antenna elements 902 can be placed inside an aerodynamic enclosure 904, which can also function as a radome. Such a configuration can be beneficial in that the antenna elements can be protected from the environment and the drag can be reduced.

Various arrangements and operating techniques for the phased array antenna can be used. For example, as shown in FIG. 8, a large number of antenna elements may be used, and groups of antenna elements combined as necessary to form desired beams, e.g. 806, 808.

Alternately, as shown in FIG. 9, the phased array antenna can include a number of different sectors or sub-arrays (e.g., 906, 908). As a particular example, the phased array antenna can include relatively large sectors 906 (to provide high gain) for low elevation angles (corresponding to typically longer ranges), and include relatively smaller sectors 908 for high elevation angles (corresponding to typically shorter ranges).

As another example, in some embodiments, a directional antenna (e.g., as illustrated and described further below) can be a mechanically-steered antenna, such as for example, a parabolic dish.

The use of antenna arrays or multiple antennas on the towed communications subsystem can enable multiple antenna beams to be formed. This can be useful in a communications network, for example, when multiple communications links are to be formed. Moreover, the ability to stabilize the towed subsystem and/or steer the antenna beams, allows for the use of directional antennas, providing higher gain and improved performance. For example, directional antennas can include antennas having a 3 dB beamwidth of less than about 45 degrees, less than about 20 degrees, less than about 10 degrees, and less than about 5 degrees (for example, optical apertures).

When towed at varying speeds and through various atmospheric conditions, the towed communications subsystem may encounter turbulence, spin, twist, or otherwise travel in a non-direct path. Additionally, the towing aircraft can change direction and orientation while towing the subsystem. These movements can affect the directional antenna's ability to establish a directional communication beam with a wireless network. Accordingly, in some embodiments, the towed communications subsystem can include means for stabilizing the directional antenna beams. For example, stabilizing can be performed electronically, mechanically, or using a combination of both. In some embodiments, electronic stabilization can be performed using an electronically steered phase array, wherein the beams are electronically adjusted to maintain substantially constant pointing directions independent of the actual orientation of the pod. In some embodiments, mechanical stabilization can be performed by stabilizing the pod, stabilizing the directional antennas, or both.

Figure 10:
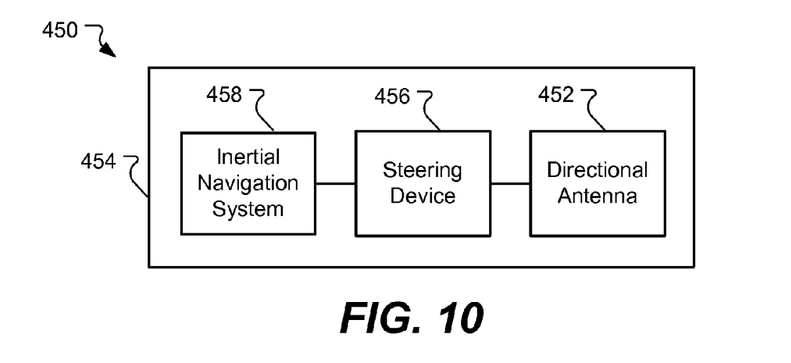
FIGS. 10, 11, 12 are block diagrams of alternate embodiments of a towed wireless network communications subsystem having an inertial navigation system for stabilization according to some embodiments of the present invention.

For example, FIG. 10 illustrates a block diagram of a towed communications subsystem 450 illustrating one variation of features to assist in stabilizing and/or beam steering in accordance with some embodiments of the present invention. A directional antenna 452 is disposed on or in the aerodynamic enclosure 454 and coupled to the aerodynamic enclosure in such a way that it can be pointed in different directions relative to the aerodynamic enclosure (e.g., for example using gimbals). A steering device 456 controls the direction in which the antenna is pointed (e.g., using azimuth and elevation drives). The steering device can, for example, accept pointing information from the towing aircraft in various forms, including for example, pointing directions expressed in various relative or inertial coordinate systems. The steering device can be coupled to an inertial navigation system 458 disposed within the aerodynamic enclosure. The inertial navigation system can provide position, orientation, and velocity of the towed communications system, allowing the steering device to compensate for motion of the towed communications subsystem. Accordingly, the directional antenna can maintain a communication link even when the aerodynamic enclosure is experiencing turbulence or changing orientation.

In some embodiments, the inertial navigation system 458 can receive navigation and/or orientation data from the host aircraft to assist it. For instance, navigational information from the host aircraft can include initial position and velocity data. The host aircraft can provide navigational information on a periodic, when-requested, or when-changed, basis. Navigation data can be exchanged via a data interface of the tether or via a wireless link between the towing aircraft and the towed communications subsystem (e.g., as described above).

Figure 11:
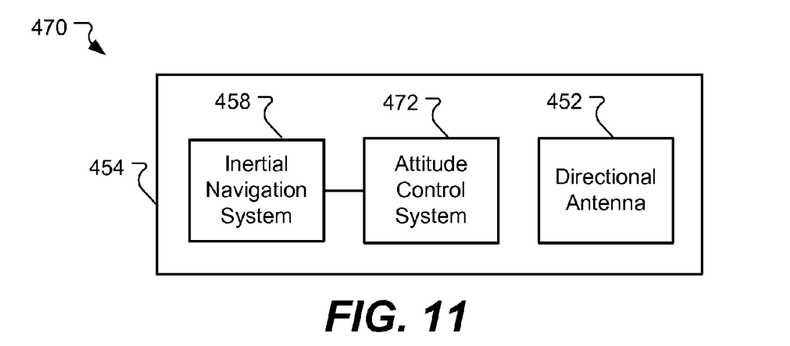

FIG. 11 illustrates an alternate arrangement of a towed communications subsystem 470, wherein the entire aerodynamic enclosure is stabilized using an inertial navigation system 458. A directional antenna 452 is disposed in or on the aerodynamic enclosure 454, and can include means for pointing (e.g., azimuth and elevation drives, electronic steering, etc.). The means for pointing can, for example, accept pointing information from the towing aircraft in various forms, including for example, pointing directions expressed in various relative or inertial coordinate systems. The inertial navigation system can be coupled to an attitude control system 472. The attitude control system can stabilize the aerodynamic enclosure into a substantially fixed (e.g., slowly changing) orientation. For example, the attitude control system can one or more active flight control surfaces, such as for example: an aileron, a fin, a flap, an elevator, a spoiler, a winglet, a slat, trim, a flaperon, an elevon, a taileron, a rudder, a thruster, etc. In some embodiments, a number of flight control surfaces can be disposed on the aerodynamic enclosure. The flight control surfaces can control the pitch, yaw, roll, or combinations thereof of the aerodynamic enclosure.

Figure 12:
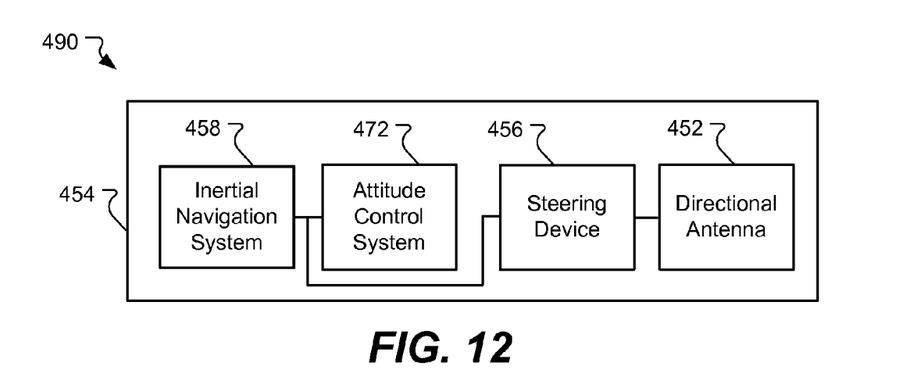

In other embodiments, for example as shown in FIG. 12, a towed communications subsystem 490 can use combinations of the above-described stabilization techniques. For example, orientation information from an inertial navigation system 458 can be provided to both a flight control system 472 and a steering device 456. The flight control system can be used to provide partial or full stabilization of the platform (e.g., limiting orientation changes within a certain control loop bandwidth). The steering device can be used to adjust the antenna pointing direction of a directional antenna 452 to compensate for remaining movement and/or system changes (e.g., tracking changes caused by net or relative movement of the host aircraft and/or other communications nodes in the wireless network).

Returning to FIG. 10, in some embodiments, the directional antenna 452 can be an electronically steered antenna, in which case the antenna is pointed in different directions by electronic control. Accordingly, the steering device 456 can include, for example, phase shifters and similar components to form one or more radio frequency beams. As another example, steering devices such as mirrors or variable refractive index lenses can be used to steer optical beams.

Although not shown in FIGS. 10-12, the towed wireless communications subsystem can include, as described above, communications equipment (e.g., 402, 502, 602, 612, 706), power generating means (e.g., 420, 422, 424) and other equipment (e.g., 430). Various types of directional antennas can be used, including phased arrays (e.g., as described above).

Returning to FIG. 1, the tether 108 will now be discussed in further detail. In some embodiments, the tether can be used primarily as a structural or strength member for supporting the weight and pull of the towed wireless network communications subsystem. For example, when a power source (e.g., 420, 422, and 424) is included on the towed wireless network and a wireless transceiver (e.g., 502) is used to exchange data with the host aircraft, the tether can be simply a strength member. For example, the strength member can include steel cable (e.g., multistrand cable), polymer cable (e.g., Kevlar® aramid fiber cable), or other structural cable type.

In some embodiments, the tether can be used for both strength and communication (e.g. data interface 408 in FIGS. 4-5, 7), and can include both a strength member and a signal communications member. For example, the signal communications member can be a fiber optic cable, a data transmission wire or wires, a data transmission coaxial cable, or other suitable device for communicating electrical or optical signals. In some embodiments, the tether can include a sheath (not shown) that acts to contain the signal communications member and strength member together in a single assembly. In other embodiments, the signal communications member and strength member can be wound together.

In some embodiments, the tether can also be used for power transfer (e.g., power interface 412 in FIGS. 4-7) and can include a separate power transmission member. For example, the power transmission member can be wires or other conductive material, including for example, a conductive sheath.

In some embodiments, the strength member can be a conductive material and can be used as the power transmission member. If desired, power conditioning (e.g., voltage transformers, filtering, regulators, converters, and the like) can be included in the towed communications subsystem to adapt the power transferred via the tether for internal use within the towed communications subsystem.

Figure 14:
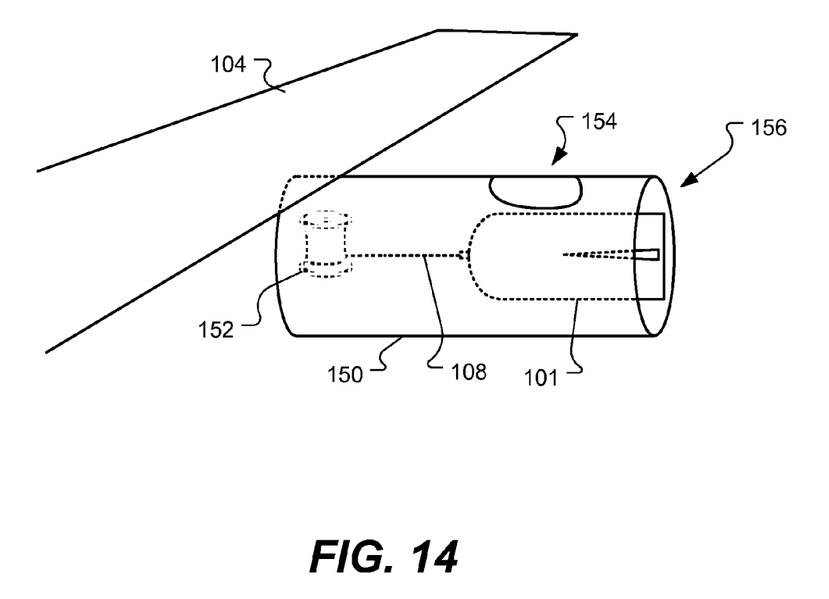
FIG. 14 is a perspective view illustration of a communication system showing detail of a storage canister and reeling system coupled to a towed wireless network communications subsystem according to some embodiments of the present invention.

To this point, the discussion has primarily focused on various examples of towed communications subsystems and operation when in a deployed (towed) position. If desired, towed communications subsystems can be configurable into a stowed position. For example, as shown in FIG. 14, in some embodiments a communications system can include a canister 150 disposed in or on the airplane 104 (e.g., a wing portion as shown in FIG. 14) and capable of receiving the towed communications subsystem 101 when in a stowed configuration (as illustrated). Coupled to the canister can be a reeling system 152 for reeling in and out and stowing the towed communications subsystem (e.g., a winch or other cable spooling/retrieving system). The reeling subsystem reels in and out the tether 108 when the towed communications subsystem is moved between stowed and deployed positions. In some embodiments, the reeling system can be configured to deploy the towed communication subsystem at varying distances away from the host aircraft during flight. This allows the aircraft to position the towed communications subsystem at desired locations in relation to the host aircraft depending on the speed, altitude, and other factors.

The canister can be disposed in various regions of the host aircraft. As one non-limiting example, the canister can be disposed in a weapons bay on a wing portion of the aircraft. As other example, the canister can be disposed on other regions of the aircraft, such as the under belly, the aft region, etc.

When stowed, the towed communications subsystem 101 can remain at least partially operational. In other words, while some blockage of the directional antennas may occur, operation of the towed communications subsystem can continue in some situations, albeit with reduced capability (e.g., reduced FOR). If desired, the canister can be configured to leave portions of the towed communications subsystem exposed when stowed. For example, the canister 150 can include one or more openings 154 to expose all or portions of one or more antennas of the towed communications subsystem. As another example, a portion of the towed communications subsystem can extends past an end 156 of the canister.

The canister 150, tether 108, reeling system 152, and towed subsystem 101 can be an integrated subsystem that can be easily installed or removed from an aircraft. For example, by configuring the integrated subsystem into the same form factor as existing munitions, the integrated subsystem may be handled, installed onto, and removed from the host aircraft using similar equipment and methods as for handling the existing munitions.

Figure 15:
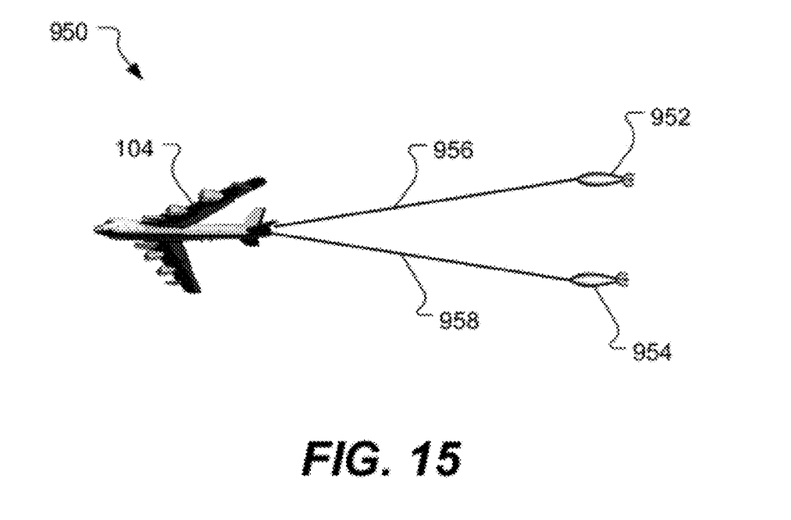
FIGS. 15 and 16 are perspective illustrations of alternate configurations of communications system having multiple towed wireless network communications subsystems according to some embodiments of the present invention.
Figure 16:
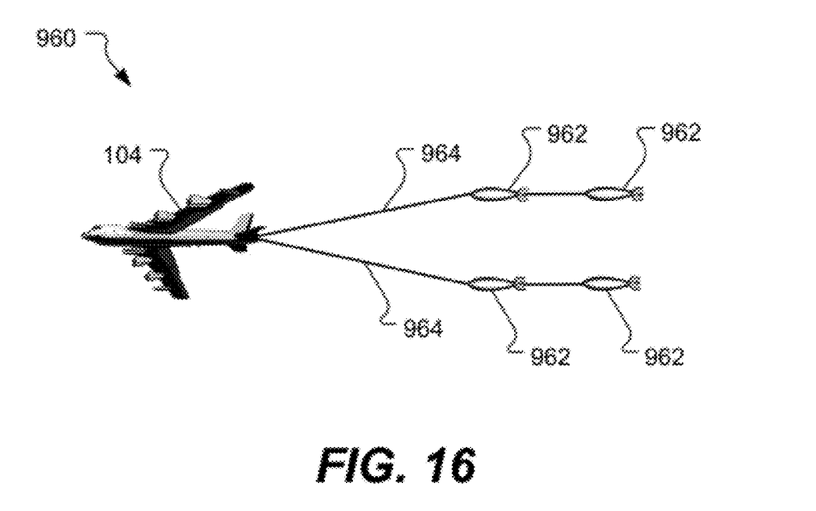

While the discussion to this point has focused on deploying a single towable communications subsystem, in some instances, it can be desirable to provide an aircraft communications system with multiple towed wireless network communications devices in some embodiments. For example, as shown in FIG. 15, a system 950 can include two devices 952 and 954 towed behind a host aircraft 104. By utilizing two towed communications subsystems, various processing techniques (e.g., combining signals to produce diversity gain), can be applied to improve the quality and reliability of wireless links established by the towed communications subsystems. Although shown here as being towed on two separate tethers 956, 958, the towed communications devices can alternatively be disposed on the same tether. Of course, more than two towed communications devices can be included in some embodiments. As a specific, non-limiting example, as shown in FIG. 16, a communications system 960 can include four communications devices 962, two devices on each of two tethers 964. Other arrangements can be used as well, and the invention is not limited to any particular number or arrangement of tethers and towed communications devices. The communications devices 952, 954, 962 can be like any of the towed wireless communications subsystems described above (e.g., 101, 400, 500, 600, 700, 450, 470, 490).

If desired, a communications system can also include additional antennas (not shown), for example, disposed on the outer fuselage of the host aircraft 104 in accordance with some embodiments of the present invention. Such additional antennas can be used in combination with one or more towed communications subsystems to provide additional processing, such as for example, diversity gain. In another embodiment, in operation of the communications system a mixture of towed communications subsystems can be used wherein some are stowed and others are deployed.

When multiple tethers are deployed (e.g., 950, 960), various techniques can be used to keep the towed network communications devices from colliding or tangling. For example, the tethers can be attached to the aircraft at different locations sufficiently separated to provide a desired low probability of tangling or collision. As another example, the towed wireless network communications devices relative positions can be controlled (e.g., using flight control surfaces as described above). As yet another example, combinations of techniques can be used.

Summarizing and reiterating to some extent, a wireless network communications system has been developed which can be towed behind an aircraft to provide the aircraft with nearly 100% FOR coverage. This approach can significantly reduce the cost and enhance the performance of the system. One or more optical and/or radio communications links can be established using the system to allow operation within a wireless network. Data and power can be exchanged between the towed portion and the host aircraft using the tether. Data can be exchanged alternatively, or in addition, using an additional optical and/or radio communications link between the towed portion and the host aircraft. Alternatively, or in addition, power can be generated on the towed portion.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A towed wireless network communications subsystem for in flight use by a towing aircraft comprising:
    an aerodynamic enclosure having a tether attachment and configured to be towed by the towing aircraft;
    a directional antenna coupled to the aerodynamic enclosure and capable of forming a directional communications beam within a wireless communications network, wherein the antenna has a near full-field-of-regard; and
    a communications device disposed in the aerodynamic enclosure, coupled to the directional antenna and configured to relay communications data between the towing aircraft and the wireless network.

2. The subsystem of claim 1, wherein the directional antenna is a plurality of directional antennas.

3. The subsystem of claim 1, wherein the directional antenna is a mechanically-steered, directional antenna.

4. The subsystem of claim 1, further comprising a tether coupled to the tether attachment, wherein the tether comprises:
    a flexible strength member; and
    a flexible signal communications member.

5. The subsystem of claim 1, further comprising:
    a flight control surface disposed on the aerodynamic enclosure; and
    an attitude control system coupled to the inertial navigation unit and to a flight control surface.

6. The subsystem of claim 1, further comprising an electronic beam steering system coupled to the inertial navigation unit and to the directional antenna.

7. The subsystem of claim 1, wherein an inertial navigation unit is coupled to the directional antenna, and wherein the directional antenna is capable of mechanical steering.

8. The subsystem of claim 1, wherein the communications device comprises a wireless transceiver for wirelessly communicating with the towing aircraft.

9. The subsystem of claim 1, further comprising a power source coupled to the aerodynamic enclosure.

10. A communications system providing near full-field-of-regard comprising:
    an aircraft;
    an aerodynamic enclosure comprising a wireless network communications device disposed therein, the wireless network communications device comprising a means for forming a directional communications link within a wireless network, wherein the means for forming the directional communications link provides a near full-field-of-regard; and
    a tether connecting the aerodynamic enclosure to the aircraft for towing the aerodynamic enclosure behind the aircraft during flight.

11. The system of claim 10, where in the wireless network communications device comprises a plurality of means for forming directional communications links within a wireless network.

12. The system of claim 10, wherein the means for forming a directional communications link has at least a 99.9% field of regard when in a deployed position.

13. The system of claim 10, wherein the means for forming a directional communications link has at least a 99.99% field of regard when in a deployed position.

14. A method of providing an aircraft with a near full-field-of-regard wireless network communications capability, the method comprising:
    providing a directional antenna disposed on an aerodynamic towable pod, the directional antenna being capable of forming a directional communications beam within a wireless network; and
    towing the aerodynamic towable pod behind the aircraft with a tether at a sufficient distance to provide the directional antenna with near full-field-of-regard; and
    forming a communications link between the directional antenna and a wireless network.

15. The method of claim 14, wherein the field of regard comprises 99.9% of a sphere.

16. The method of claim 14, wherein the field of regard comprises 99.99% of a sphere.

17. The method of claim 14, further comprising communicating data from the communications link to the aircraft.

18. The method of claim 14, further comprising steering the pod using flight control surfaces disposed on the pod.

19. The method of claim 14, further comprising electronically stabilizing the directional antenna.

20. The method of claim 14, further comprising stabilizing the directional antenna using an inertial navigation unit disposed on the pod.

21. The method of claim 14, further comprising:
towing a plurality of aerodynamic towable pods behind an aircraft on a tether; and
combining wireless network signals communicated via each of the plurality of aerodynamic towable pods to obtain a diversity gain.

22. The method of claim 14, further comprising radiating electronic countermeasure signals from the aerodynamic towable pod.

23. The method of claim 14, further comprising performing signal intelligence gathering at the aerodynamic towable pod.

24. The subsystem of claim 1, wherein the directional antenna is an individual antenna.

25. The subsystem of claim 1, wherein:
the communications network is a data communications network, and
the directional communications beam is a data communications beam.

26. The subsystem of claim 10, wherein the direction communications link is a data communications link.

27. The method of claim 14, wherein the directional antenna is an individual antenna.

28. The method of claim 14, wherein the communications link is a data communications link.

* * * * *